US012752680B2

(12) United States Patent
He et al.

(10) Patent No.: US 12,752,680 B2
(45) Date of Patent: Oct. 6, 2026

(54) CHILD AUTOMOBILE SAFETY SEAT

(71) Applicant: Goodbaby Child Products Co., Ltd., Kunshan City (CN)

(72) Inventors: Xinjun He, Kunshan (CN); Zhiyong Kuang, Kunshan (CN); Li Lin, Kunshan (CN)

(73) Assignee: Goodbaby Child Products Co., Ltd., Kunshan (CN)

( * ) Notice: Subject to any disclaimer, the term of this patent is extended or adjusted under 35 U.S.C. 154(b) by 68 days.

(21) Appl. No.: 18/711,994

(22) PCT Filed: Nov. 22, 2022

(86) PCT No.: PCT/CN2022/133391
§ 371 (c)(1),
(2) Date: May 21, 2024

(87) PCT Pub. No.: WO2023/088476
PCT Pub. Date: May 25, 2023

(65) Prior Publication Data

US 2025/0001915 A1 Jan. 2, 2025

(30) Foreign Application Priority Data

Nov. 22, 2021 (CN) ......................... 202111385167.0

(51) Int. Cl.

| | |
|---|---|
| ***B60N 2/28*** | (2006.01) |
| ***B60R 21/20*** | (2011.01) |
| ***B60R 21/207*** | (2006.01) |

(52) U.S. Cl.
CPC ......... *B60N 2/2839* (2013.01); *B60N 2/2884* (2013.01); *B60R 21/2072* (2013.01)

(58) Field of Classification Search
CPC .. B60R 21/2072; B60N 2/2839; B60N 2/2884
See application file for complete search history.

(56) References Cited

U.S. PATENT DOCUMENTS

| | | | |
|---|---|---|---|
| 4,580,842 A | 4/1986 | Segal et al. | |
| 4,880,277 A * | 11/1989 | Takahashi ............ | B60N 2/7005 297/484 |

(Continued)

FOREIGN PATENT DOCUMENTS

| | | |
|---|---|---|
| AU | 2009250945 A1 | 7/2010 |
| CN | 1097695 A | 1/1995 |

(Continued)

*Primary Examiner* — Rodney B White

(74) *Attorney, Agent, or Firm* — Muncy, Geissler, Olds & Lowe, P.C.

(57) ABSTRACT

A child automobile safety seat includes a seat body having a sitting space, and a restraint system. The seat body includes a seat and a backrest. The restraint system includes restraint pieces and a protective piece. Two sets of restraint pieces are respectively arranged on the left side and the right side of the backrest. The protective piece is movably arranged at the front part of the seat, and is provided with a protective surface which faces the sitting space. When the restraint system is in a restraint state, the two sets of restraint pieces are respectively matched with and connected to the protective piece. When the restraint system is in an open state, the two sets of restraint pieces are respectively separated from the protective piece.

15 Claims, 12 Drawing Sheets

(56) References Cited

U.S. PATENT DOCUMENTS

| | | | | | |
|---|---|---|---|---|---|
| 5,184,844 | A * | 2/1993 | Goor | B60R 21/18 | 280/808 |
| 5,286,086 | A * | 2/1994 | Gunji | B60N 2/2806 | 297/250.1 |
| 5,375,908 | A * | 12/1994 | Goor | B60R 21/01 | 297/216.11 X |
| 5,511,850 | A * | 4/1996 | Coursey | B60N 2/2839 | 297/216.11 X |
| 5,653,501 | A * | 8/1997 | Goor | B60N 2/286 | 297/216.11 |
| 5,655,817 | A * | 8/1997 | Nienow | B60R 22/105 | 297/216.11 X |
| 5,711,574 | A * | 1/1998 | Barnes | B60R 21/207 | 297/216.11 X |
| 5,720,519 | A * | 2/1998 | Barnes | B60R 22/14 | 297/217.3 |
| 5,779,304 | A * | 7/1998 | Cunningham | B60N 2/2839 | 297/216.11 X |
| 5,782,486 | A * | 7/1998 | Barnes | B60R 21/268 | 137/68.13 |
| 6,062,596 | A * | 5/2000 | Boydston | B60R 21/2072 | 280/733 |
| 6,736,455 | B1 * | 5/2004 | Zakovic | B60R 21/2072 | 297/488 |
| 7,125,073 | B2 * | 10/2006 | Yoshida | B60N 2/2851 | 297/216.11 X |
| 7,232,182 | B2 * | 6/2007 | Yoshida | B60R 21/2338 | 297/216.11 |
| 7,293,828 | B2 * | 11/2007 | Yoshida | B60R 21/2338 | 297/216.11 X |
| 7,748,781 | B2 * | 7/2010 | Bass | B60N 2/2809 | 297/216.11 X |
| 8,690,188 | B2 * | 4/2014 | Fiore | B60R 22/10 | 297/484 |
| 8,851,514 | B2 * | 10/2014 | Renaudin | B60R 22/28 | 280/733 |
| 9,126,557 | B2 * | 9/2015 | Renaudin | B60N 2/266 | |
| 9,707,868 | B2 * | 7/2017 | Renaudin | B60N 2/271 | |
| 10,703,230 | B2 * | 7/2020 | Zeng | B60N 2/2884 | |
| 11,214,216 | B2 * | 1/2022 | Powell | B60R 22/1951 | |
| 2006/0038436 | A1 | 2/2006 | Dorel et al. | | |

FOREIGN PATENT DOCUMENTS

| | | | | | |
|---|---|---|---|---|---|
| CN | 1187433 | A | | 7/1998 | |
| CN | 1872583 | A | | 12/2006 | |
| CN | 107985137 | A | | 5/2018 | |
| CN | 109177828 | A | * | 1/2019 | B60N 2/28 |
| CN | 109204218 | A | * | 1/2019 | B60R 21/2072 |
| CN | 110171330 | A | * | 8/2019 | B60N 2/28 |
| CN | 110254302 | A | * | 9/2019 | B60N 2/2884 |
| CN | 210047368 | U | * | 2/2020 | B60R 21/2072 |
| CN | 112292284 | A | * | 1/2021 | B60N 2/2806 |
| CN | 114084049 | A | | 2/2022 | |
| CN | 216636246 | U | | 5/2022 | |
| DE | 4341218 | A1 | * | 6/1995 | B60N 2/2839 |
| DE | 19534126 | C1 | * | 10/1996 | B60N 2/2839 |
| DE | 19722095 | C1 | * | 12/1998 | B60N 2/2812 |
| DE | 10351918 | A1 | * | 6/2005 | B60N 2/42745 |
| DE | 202017105118 | U1 | * | 1/2019 | B60N 2/2887 |
| DE | 102019117697 | A1 | * | 1/2021 | B60N 2/2848 |
| EP | 1452386 | A1 | | 9/2004 | |
| EP | 1623892 | A1 | | 2/2006 | |
| GB | 2290505 | A | * | 1/1996 | B60N 2/273 |
| GB | 2323571 | A | * | 9/1998 | B60N 2/267 |
| JP | 2000301969 | A | | 10/2000 | |
| JP | 2017071239 | A | | 4/2017 | |
| KR | 102100080 | B1 | * | 4/2020 | B60N 2/2839 |
| WO | WO-9307026 | A1 | * | 4/1993 | B60R 21/2072 |
| WO | WO-2018052976 | A1 | * | 3/2018 | B60R 21/0132 |
| WO | WO-2019092113 | A1 | * | 5/2019 | B60N 2/272 |

* cited by examiner

A-A

CHILD AUTOMOBILE SAFETY SEAT

CROSS-REFERENCE TO RELATED APPLICATIONS

This application claims priority to PCT Application No. PCT/CN2022/133391 filed on Nov. 22, 2022, which is based on Chinese Application No. 2021113851670 filed on Nov. 22, 2021 with China Patent Office, the entire contents both of which are hereby incorporated by reference.

BACKGROUND

In the prior art, child automobile safety seats are all provided with a restraint system used for restraining a child and ensuring child safety, and common restraint systems on the market include a five-point seat belt, a front body protector and the like. Among them, the five-point seat belt includes a plurality of soft connecting belts, such as harness straps, waist belts, and crotch belts. The connecting belts are connected with one another by hard buckles, so that an installation mode is relatively complicated. When not used, the connecting belts will be randomly stacked inside the seat, and even wound together, thus being neither attractive nor convenient to reuse, as parents must firstly push aside the connecting belts and then take the child to the seat, which is difficult for a single parent to complete. In addition, for younger children, due to a relatively small stressed area of the five-point seat belt, the children are likely to feel discomfort of tightening or knocking pain, and will be subjected to great pressure on the neck during emergency braking.

The front body protector generally includes a relatively large retaining block which is transversely arranged on a front portion of a child body. The retaining block may provide a large area of protection for the front portion of the child body, and is applicable to children under the age of four. However, the current front body protector is only connected on a left side and a right side of the child automobile safety seat, and there is a risk that the child body rushes out from an upper side or a lower side of the front body protector, so that certain safety hidden trouble exists. In addition, due to a relatively large volume of the front body protector, the front body protector is very limited in adjustable range, and difficult to be truly applicable to children of various body types, so that the children may not be restrained in place with a gap, or may feel chest distress and discomfort caused by too tight restraint.

SUMMARY

It is an object of the present disclosure to provide a child automobile safety seat having a highly safe and comfortable restraint system aiming at the problems existing in the prior art.

In order to achieve the object above, the technical solution adopted by the present disclosure is as follows.

A child automobile safety seat includes a seat body having a sitting space, and a restraint system used for restraining a child in the sitting space, the seat body including a seat and a backrest, the restraint system including restraint pieces and a protective piece, wherein the protective piece is arranged at a front part of the seat in a manner of being relatively rotatable about a first rotation centerline, the first rotation centerline extends in a left-right direction of the seat body, the protective piece is provided with a protective surface which faces the sitting space and is used for protecting waist and abdomen of the child, the protective surface is gradually curved towards the sitting space from inside to outside, and the restraint system further includes a first driving piece used for driving the protective piece to be away from the sitting space; two sets of restraint pieces are respectively arranged on a left side and a right side of the backrest, and the restraint system further includes a second driving piece used for driving the restraint pieces to be away from the sitting space; the restraint system has a restraint state and an open state, when the restraint system is in the restraint state, the two sets of restraint pieces are respectively matched with and connected to the protective piece; and when the restraint system is in the open state, the two sets of restraint pieces are respectively separated from the protective piece, the protective piece is positioned outside the sitting space, and the two sets of restraint pieces are positioned outside the sitting space.

A child automobile safety seat includes a seat body having a sitting space, and a restraint system used for restraining a child in the sitting space, the seat body including a seat and a backrest, the restraint system including restraint pieces and a protective piece, wherein two sets of restraint pieces are respectively arranged on a left side and a right side of the backrest, the protective piece is movably arranged at a front part of the seat, and is provided with a protective surface which faces the sitting space and is used for protecting waist and abdomen of the child, the restraint system has a restraint state and an open state, when the restraint system is in the restraint state, the two sets of restraint pieces are respectively matched with and connected to the protective piece; and when the restraint system is in the open state, the two sets of restraint pieces are respectively separated from the protective piece.

In some examples, the restraint system further includes a first driving piece used for driving the protective piece to be away from the sitting space, and the protective piece is positioned outside the sitting space when the restraint system is in the open state.

In some examples, the restraint system further includes a second driving piece used for driving the restraint pieces to be away from the sitting space, and the two sets of restraint pieces are positioned outside the sitting space when the restraint system is in the open state.

In some examples, the second driving piece is compression springs, two sets of compression springs on the left side and the right side are respectively matched with the two sets of restraint pieces, one end of each set of compression spring is connected to the backrest, and the other end of the compression spring is connected to the restraint piece.

In some examples, each set of restraint piece includes a harness strap and an insertion piece, the insertion piece is arranged at one end of the harness strap, and the protective piece is provided with an insertion slot; when the restraint system is in the restraint state, the two sets of insertion pieces are respectively inserted in the insertion slots correspondingly; and when the restraint system is in the open state, the two sets of insertion pieces are respectively released from the insertion slots.

In some examples, the protective piece is provided with a first end, the first end is movably arranged on the seat, when the restraint system is in the restraint state, the protective surface faces the backrest; and when the restraint system is in the open state, the protective surface is arranged upwards.

In some examples, the first end is arranged on the seat in a manner of being relatively rotatable about the first rotation centerline, the first rotation centerline extends in the left-right direction of the seat body, and the restraint system further includes an elastic piece used for providing an acting force required for the protective piece to rotate away from the sitting space.

In some examples, the first end is rotatably connected to the seat through a first shaft, and the elastic piece is a torsion spring rotatably arranged on the first shaft.

In some examples, the protective piece includes a restraint lever and a protective block, the restraint lever is provided with a first end, the first end is movably arranged on the seat, and the protective block is arranged on the restraint lever in a manner of being relatively rotatable.

In some examples, the restraint lever is made of a rigid material.

In some examples, the protective block is arranged on the restraint lever in a manner of being relatively rotatable about a second rotation centerline, and the second rotation centerline extends in the left-right direction of the seat body.

In some examples, the restraint lever is further provided with a second end, the second end and the first end are respectively arranged at two different ends of the restraint lever in a length direction, and the protective block is arranged at the second end in a manner of being relatively rotatable.

In some examples, one side of the protective piece which faces the sitting space is provided with a flexible protective cushion, and the protective surface is formed on the protective cushion.

In some examples, the protective surface is a cambered surface which is gradually curved towards the sitting space from inside to outside in the left-right direction of the seat body.

In some examples, the protective piece is provided with the first end and a second end which are respectively arranged at two different ends of the protective piece in the length direction, the first end is arranged on the seat, and a width of the protective surface is gradually increased in a direction extending from the first end to the second end.

In some examples, the protective block is in a triangular shape with a wide upper portion and a narrow lower portion.

In some examples, the protective piece includes the restraint lever and the protective block, the restraint lever is provided with the first end and the second end which are respectively arranged at two different ends of the restraint lever in the length direction, the first end is arranged on the seat, the protective block is arranged at the second end, the protective block is provided with the protective surface, and the restraint lever is gradually curved towards the sitting space from the first end to the second end.

In some examples, the restraint system further includes a hollow airbag, the airbag is arranged on the protective piece, the protective piece is provided with an accommodating chamber, the airbag has a storage state and an inflated state, when the airbag is in the storage state, the airbag is accommodated in the accommodating chamber; and when the airbag is in the inflated state, the airbag is inflated and positioned outside the protective piece.

In some examples, the accommodating chamber is provided with an opening positioned on a front side of the protective piece, when the airbag is converted from the storage state to the inflated state, the airbag is stretched above the front side of the protective piece; and when the airbag is in the inflated state, the airbag is at least partially positioned above the front side of the protective piece.

In some examples, the restraint system further includes an air generating device, the air generating device includes an air generator, an electronic control unit, and a power supply which are arranged on the seat body, the electronic control unit is electrically connected to the power supply and the air generator respectively, and the air generator is connected to the airbag through an air guide pipe.

Due to the application of the technical solution above, according to the child automobile safety seat provided by the present disclosure, the protective piece has a large protective surface which may be softly adhered to the waist and abdomen of the child to evenly apply pressure and form protection in a wide range, such that the discomfort of the child may be reduced to the maximum extent; and the whole set of restraint system may evenly restrain the child from the upper portion, the lower portion, the left portion, and the right portion, thereby avoiding the risk that the child rushes out of the sitting space from a certain side; in addition, the protective piece will not be randomly stacked in the sitting space, such that the seating space is neat and spacious, the child may be directly seated, and a single parent may also operate independently with great convenience and quickness.

BRIEF DESCRIPTION OF THE DRAWINGS

In order to more clearly illustrate the technical solution of the present disclosure, a brief description of the accompanying drawings which need to be used in the description of examples will be given below. It is obvious that the accompanying drawings in the description below are only some examples of the present disclosure, and for those ordinarily skilled in the art, other accompanying drawings may also be obtained according to these accompanying drawings without involving any inventive effort.

Figure 1:
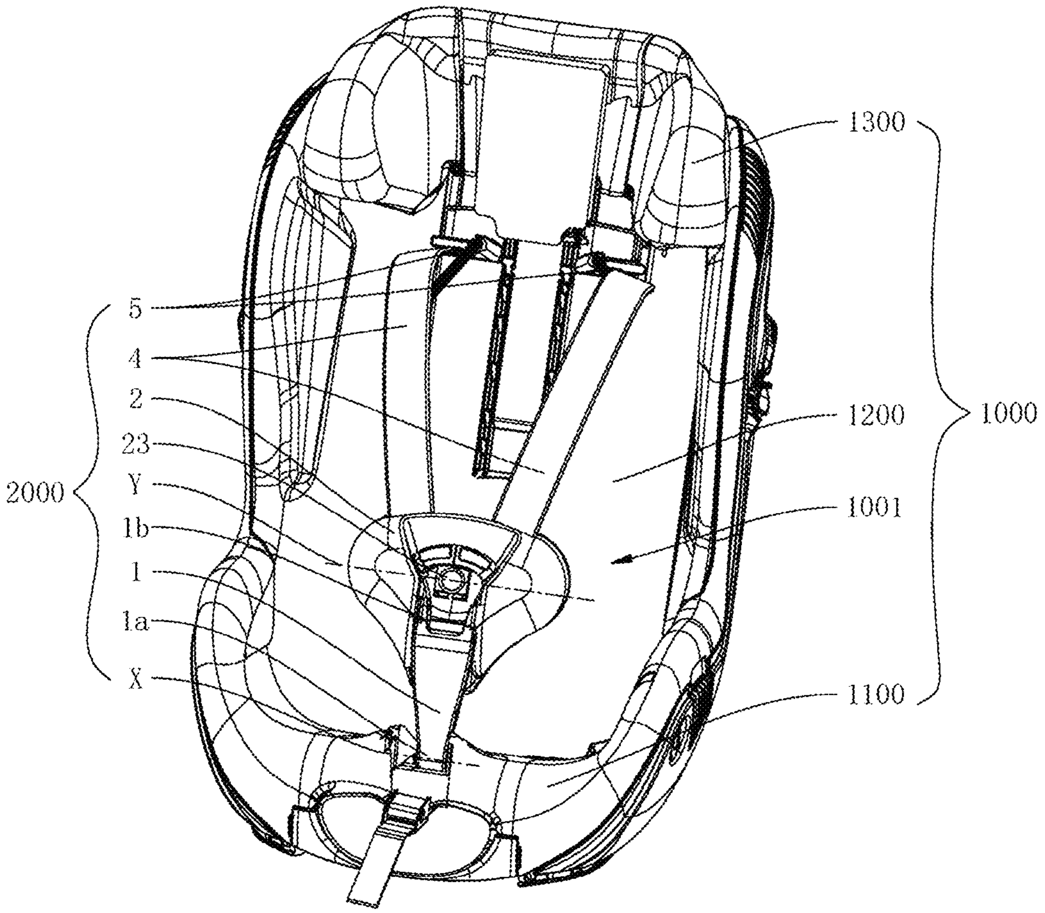
FIG. 1 is a schematic perspective view of a child automobile safety seat in an example, with a restraint system being in a restraint state.

in the drawings: 1000. seat body; 1001. sitting space; 1100. seat; 1200. backrest; 1300. headrest; 2000. restraint system; 1. restraint lever; **1*a*. first end; lb. second end; 11. first shaft; 2. protective block; 21. protective cushion; 2*a*. protective surface; 2*b*. accommodating chamber; 22. insertion slot; 23. unlocking piece; 3. first driving piece; 4. restraint piece; 41. harness strap; 42. insertion piece; 5. second driving piece; 61. airbag; 62. air generator; 63. electronic control unit; 64. power supply; 65**. air guide pipe; X. first rotation centerline; and Y. second rotation centerline.

DETAILED DESCRIPTION

Preferred examples of the present disclosure will be illustrated in detail below with reference to the accompanying drawings, so that the advantages and features of the present disclosure may be more readily understood by those skilled in the art.

Figure 6:
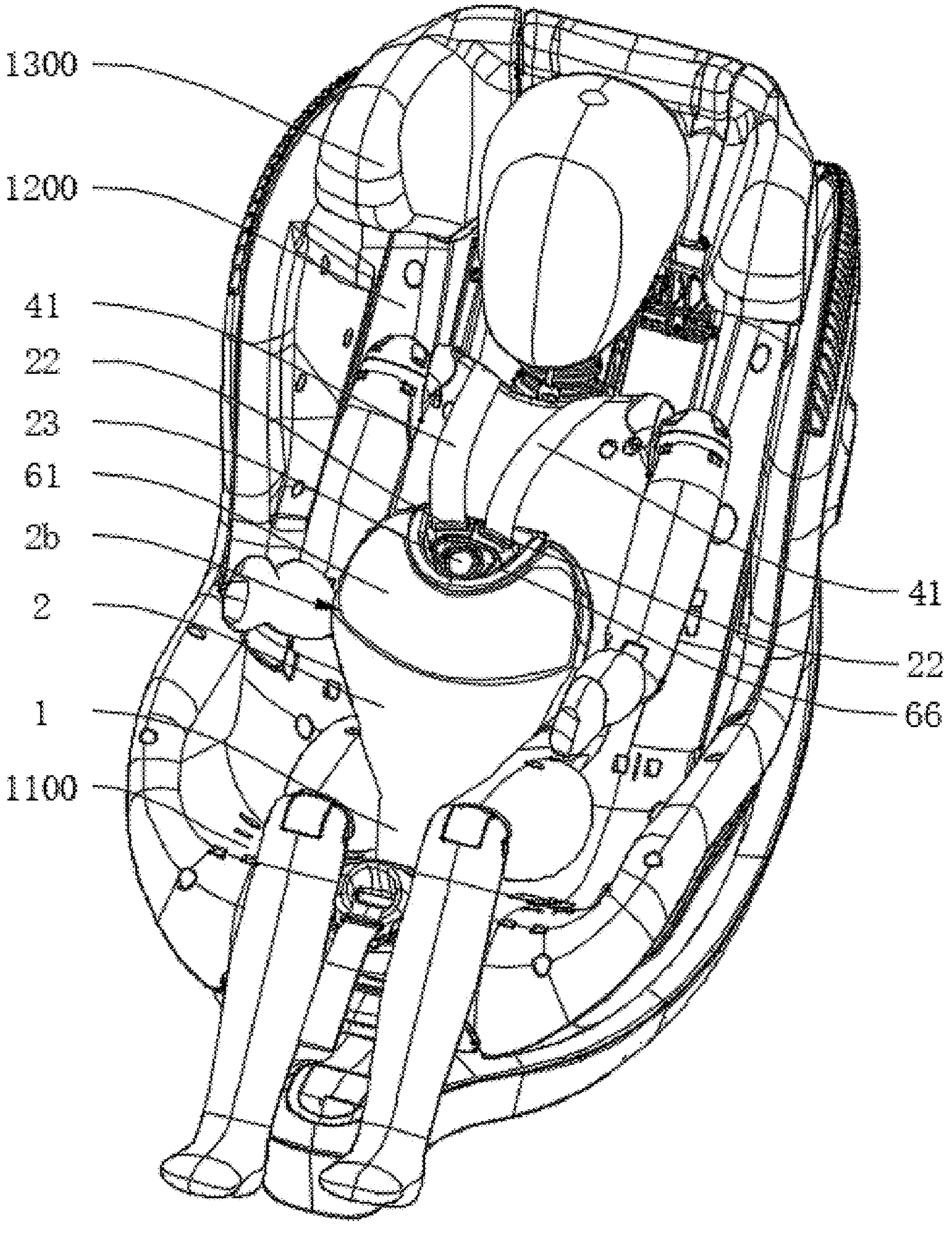
FIG. 6 is a schematic perspective view of a child seated in the child automobile safety seat in an example, with an airbag being in a storage state.

In the description of the present disclosure, it should be noted that the orientation or positional relationship indicated by the terms "center", "upper", "lower", "left", "right", "vertical", "horizontal", "inner", "outer", "left-right direction", "height direction", "front-rear direction" and the like is the orientation or positional relationship observed by a child when the child is normally seated on a child automobile safety seat based on FIG. 1 or FIG. 6, which is only for the convenience of describing the present disclosure and simplifying the description, and does not indicate or imply that the device or element referred to must have a particular orientation, only has a particular orientation, or is constructed and operated in a particular orientation, and therefore should not be construed as limiting the present disclosure.

Figure 2:
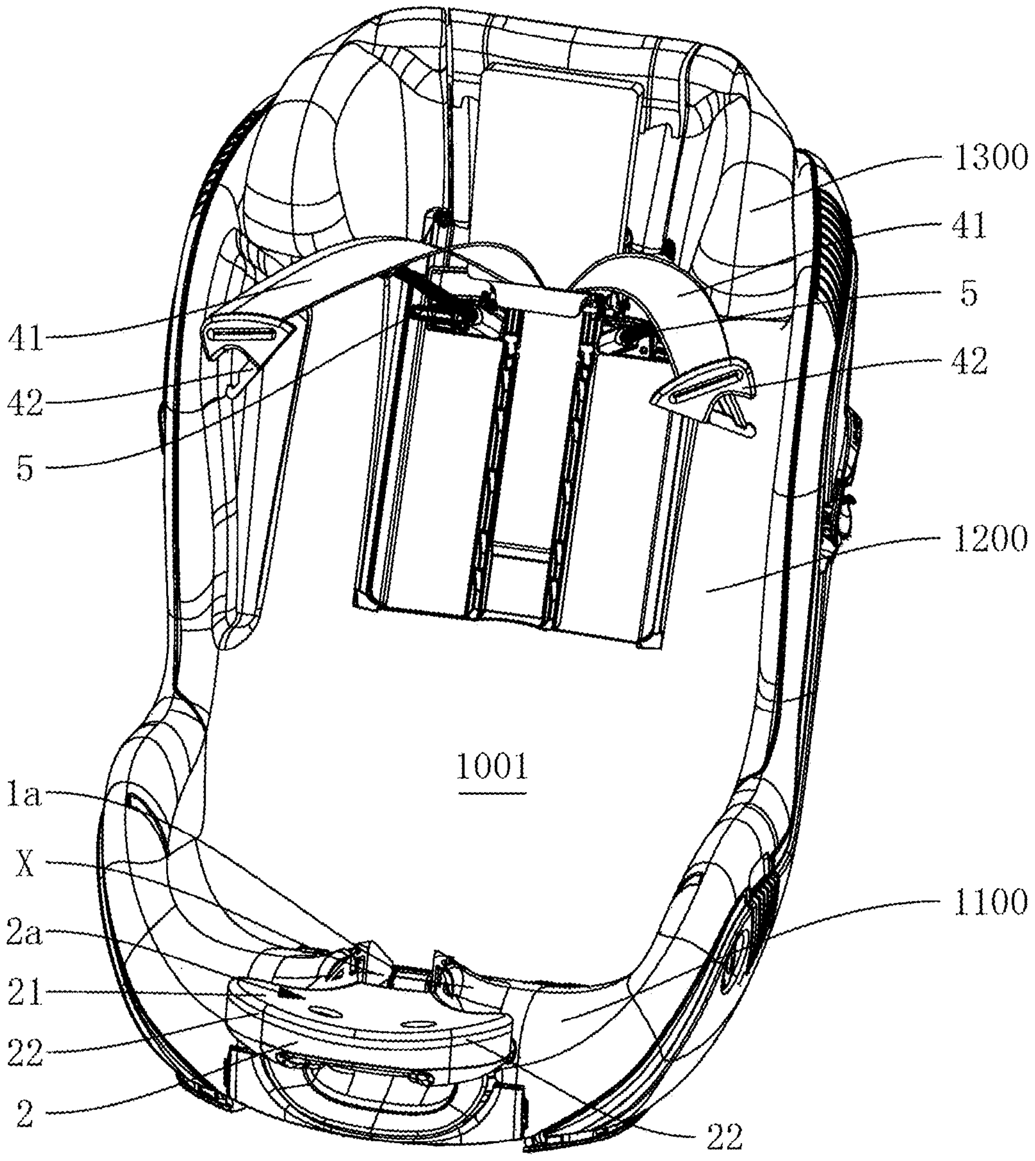
FIG. 2 is a schematic perspective view of the child automobile safety seat in an example, with the restraint system being in an open state.

Referring to FIG. 1 and FIG. 2, a child automobile safety seat includes a seat body 1000 having a sitting space 1001, and a restraint system 2000 used for restraining a child in the sitting space 1001. The seat body 1000 specifically includes a seat 1100, a backrest 1200, and a headrest 1300, which together enclose the sitting space 1001 above for a child to seat therein.

It should be noted that the child automobile safety seat may further include a base (not shown) used for being connected to an automobile seat, and the seat body 1000 may be arranged on the base in a manner of being relatively rotatable and/or detachably arranged on the base.

In this example, the restraint system 2000 includes a protective piece and restraint pieces 4, wherein two sets of restraint pieces 4 are respectively arranged on a left side and a right side of the backrest 1200, and the protective piece is movably arranged at a front part of the seat 1100, and is provided with a protective surface 2*a* which faces the sitting space 1001 and is used for protecting waist and abdomen of the child. The restraint system 2000 further includes a first driving piece 3 used for driving the protective piece to be away from the sitting space 1001, and a second driving piece 5 used for driving the restraint pieces 4 to be away from the sitting space 1001.

In this example, the protective piece further includes a restraint lever 1 and a protective block 2, wherein the hard restraint lever 1 is provided with first end 1*a* and a second end 1*b* which are respectively arranged at two different ends of the restraint lever 1 in a length direction, the first end 1*a* is arranged at the front part of the seat 1100 through a first shaft 11 in a manner of being relatively rotatable about a first rotation centerline X, the protective block 2 is arranged at the second end 1*b* in a manner of being relatively rotatable about a second rotation centerline Y, and the first rotation centerline X and the second rotation centerline Y respectively extend in a left-right direction of the seat body 1000, and are parallel to each other. The restraint lever 1 is slightly curved towards the sitting space 1001 from the first end 1*a* to the second end 1*b*, thereby conforming to a body curve of the abdomen of the child, and restraining the child more comfortably and snugly.

In this example, one side of the protective block 2 which faces the sitting space 1001 is provided with a flexible protective cushion 21, and the protective surface 2*a* is formed on the protective cushion 21. The protective cushion 21 may be specifically made of a flexible material or a material having certain thickness and elasticity, such as thick cloth, sponge and rubber, and the protective cushion 21 may cover a whole side surface of the protective block 2 which faces the sitting space 1001. The protective surface 2*a* is a cambered surface which is gradually curved towards the sitting space 1001 from inside to outside in the left-right direction of the seat body 1000; and the protective surface 2*a* is also gradually curved towards the sitting space 1001 from inside to outside in a direction extending from the first end 1*a* to the second end 1*b*. On the other hand, a width of the protective surface 2*a* is gradually increased in the direction extending from the first end 1*a* to the second end 1*b*, namely the protective block 2 is substantially in a triangular shape with a wide upper portion and a narrow lower portion. The protective block 2 in the triangular shape has smooth edges, without sharp corners, so that the protective block 2 will not cause significant collision and knocking feeling to the child. In this way, the protective surface 2*a* conforms to a body type of the waist and abdomen of the child in a three-dimensional space, and the protective surface 2*a* may cover and wrap the waist and abdomen of the child from a front portion in a large area softly and snugly like a cover on the whole, so as to form support for the front portion of a child body with a uniform applied force, without causing the child to feel the pain of colliding with the hard component, so that the protective piece is more comfortable and safer.

Referring to FIG. 1, in this example, the first end 1*a* of the restraint lever 1 is specifically connected to a front end of an upper surface of the seat 1100, when the child is seated in the sitting space 1001, an upper body of the child is positioned on a rear side of the first end 1*a* and the whole protective piece, legs of the child may respectively stretch forwards from a left side and a right side of the restraint lever 1, and the restraint lever 1 and the shape of the protective block 2 with the wide upper portion and the narrow lower portion may make room for the legs of the child, so that the design of the whole protective piece more conform to a human body curve.

Figure 4:
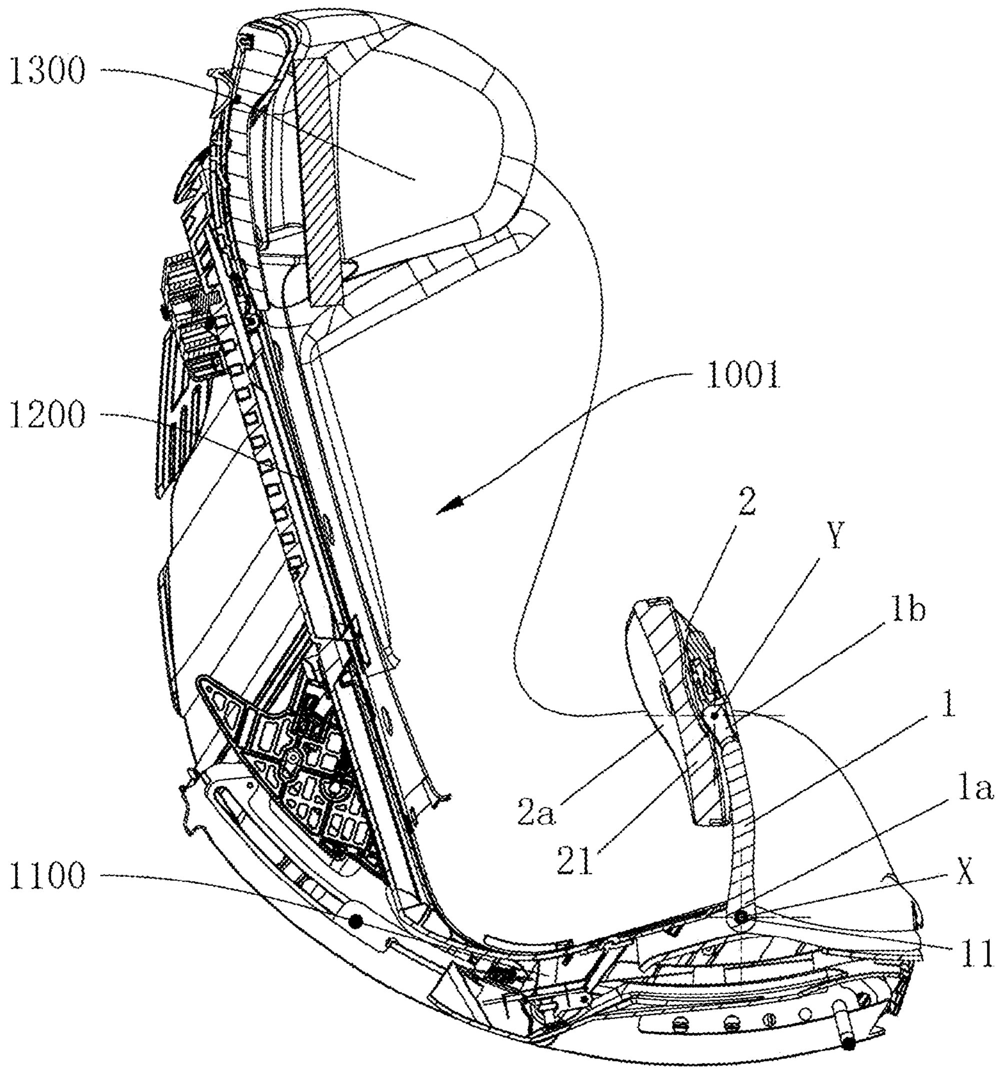
FIG. 4 is a schematic cross-sectional view of the child automobile safety seat in an example, with the restraint system being in the restraint state.
Figure 5:
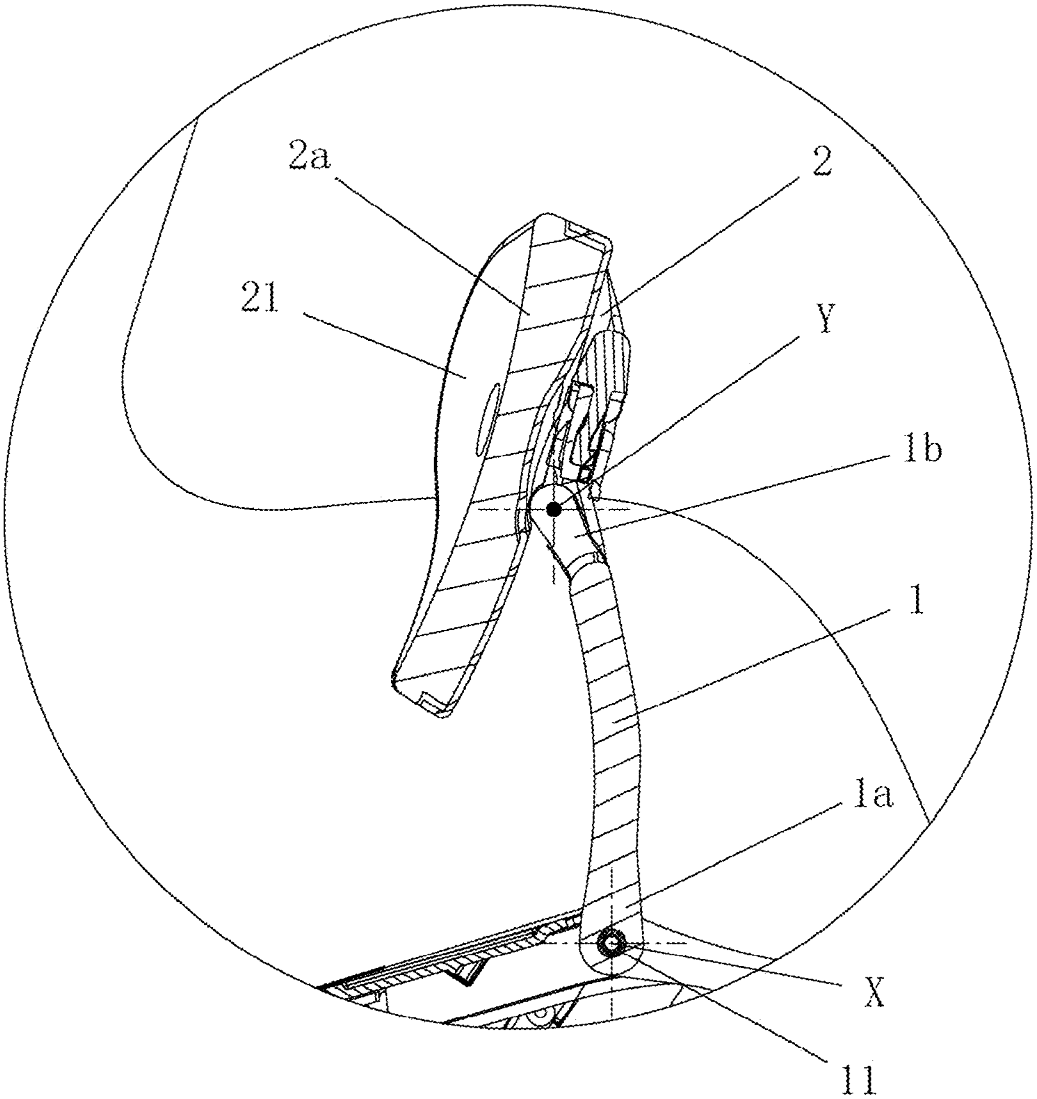
FIG. 5 is a schematic partial cross-sectional view of a protective piece in an example.

Further, referring to FIG. 4 and FIG. 5, the protective block 2 may be turned up and down with respect to the second end 1*b* around the second rotation centerline Y within a certain angle range, so that the protective block 2 may be automatically adjusted to the most suitable angle for children of different heights and different body types, and protect the child bodies most snugly and comfortably. Specifically, a limiting structure used for limiting a rotation angle of the protective block 2 is arranged between the restraint lever 1 and the protective block 2, so that the normal use of the protective block 2 may not be affected by an unreasonably excessive rotation angle thereof, and generally, the angle range of the protective block 2 rotating back and forth does not exceed 90 degrees. In other examples, other connecting modes may also be adopted between the protective block 2 and the restraint lever 1, for example, the protective block 2 may be rotatably connected to the second end 1*b* of the restraint lever 1 through a spherical joint. At this time, the rotation angle of the protective block 2 may be arbitrarily changed within a space range defined by the spherical joint, and when the child slightly turns and moves in the sitting space 1001, the protective surface 2*a* may still be well adhered to protect the waist and abdomen thereof. In other examples, the protective piece may also be a one-piece component integrally arranged, without distinguishing the restraint lever 1 from the protective piece 2. At this time, the first end 1*a* and the second end 1*b* are respectively arranged at two different ends of the whole protective piece, the protective piece and the protective surface 2*a* thereof are in the triangular shape with the wide upper portion and the narrow lower portion on the whole, and the first end 1*a* rotates around the first rotation centerline X, so that the structure is simpler. At this time, the protective piece in the triangular shape may also give way to the legs of the child to ensure comfort in use.

Figure 3:
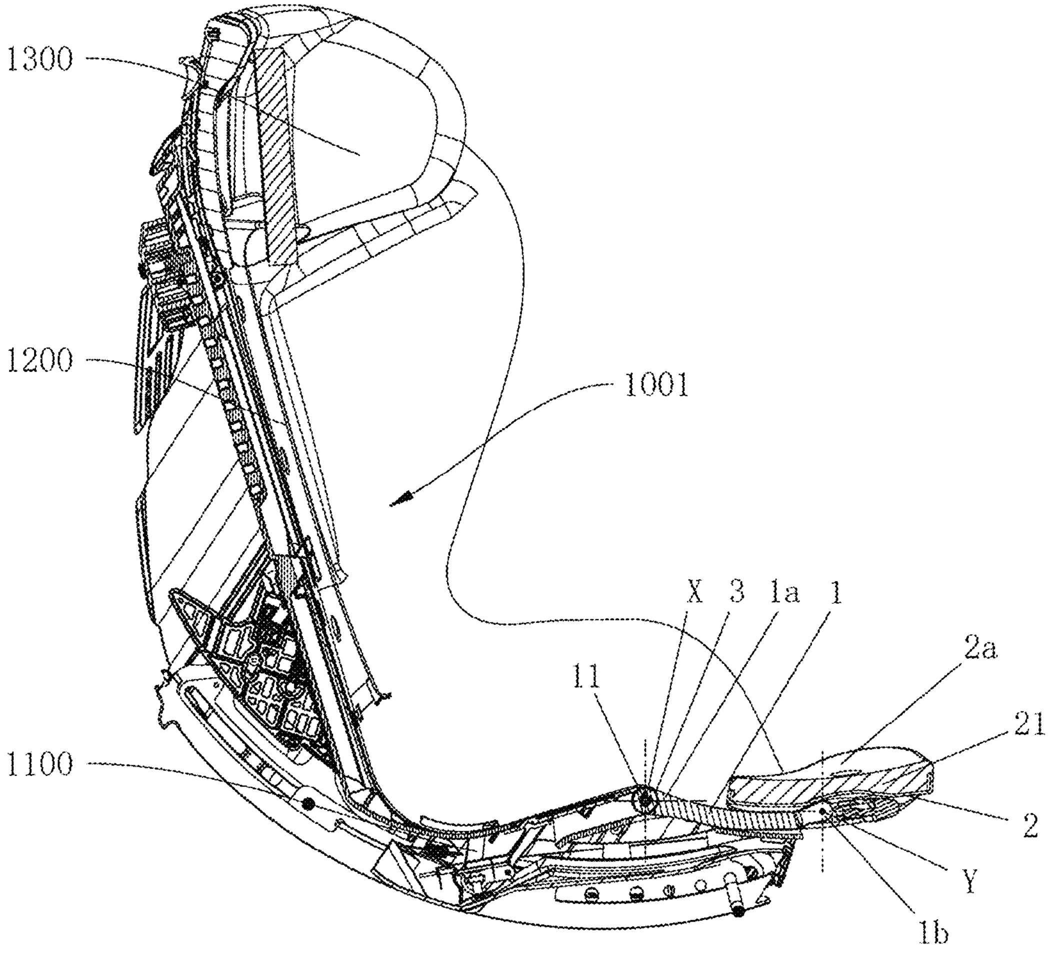
FIG. 3 is a schematic cross-sectional view of the child automobile safety seat in an example, with the restraint system being in the open state.

Referring to FIG. 3 and FIG. 4, in this example, the first driving piece 3 is an elastic piece used for providing an acting force required for the restraint lever 1 to rotate away from the sitting space 1001, and is specifically a torsion spring herein. The torsion spring is rotatably arranged on the first shaft 11 with one end thereof abutting against the seat 1100 and the other end thereof abutting against the first end 1*a* of the restraint lever 1, so that when no external force is applied to the restraint lever 1, the restraint lever 1 may automatically rotate outwards away from the sitting space 1001 under an elastic action of the torsion spring, and finally abut against the upper surface of the seat 1100. In other examples, the particular arrangement of the first driving piece 3 may not be limited to the torsion spring, and other forms of elastic pieces and the like may be adopted.

Referring to FIG. 1 and FIG. 2, in this example, two sets of restraint pieces 4 on the left side and the right side are used for being matched with the protective piece to form protection for shoulders of the child. Specifically, each set of restraint piece 4 includes a harness strap 41 and an insertion piece 42 arranged at one end of the harness strap 41, wherein the harness strap 41 has certain stiffness and elasticity, may not completely sag or not be folded and wound in a natural state, and may maintain a curve with a certain radian above the sitting space 1001, and the harness strap 41 may be specifically made of a material, such as relatively thick cloth and rubber. In this example, an upper end of each harness strap 41 is connected to an upper part of the backrest 1200, and the insertion piece 42 is fixedly connected to a lower end of the harness strap 41. In order to adapt to children of different heights and body types, the upper end of each harness strap 41 may be connected to the backrest 1200 in a manner of being relatively slidable, and a parent may adjust a length of each harness strap 41 stretching forwards from a rear side of the backrest 1200, so as to ensure that a restraining length of the harness strap 41 is suitable, thereby being neither too loose nor too tight. In this example, the protective block 2 is correspondingly provided with two sets of insertion slots 22 for the insertion pieces 42 on the left side and the right side to be respectively inserted to be matched and connected. The protective block 2 is further provided with a locking mechanism used for locking the two sets of insertion pieces 42 in the insertion slots 22, and an unlocking mechanism used for unlocking the insertion pieces 42. The unlocking mechanism includes an unlocking piece 23 used for operation. The specific structures of the locking mechanism and the unlocking mechanism may be adopted from the prior art, and are not limited in the present disclosure.

Referring to FIG. 2, in this example, in order to enable the restraint piece 4 to have a function of being automatically away from the sitting space 1001 similar to that of the protective piece, specifically compression springs are adopted as the second driving piece 5, two sets of compression springs on the left side and the right side are respectively matched with the two sets of restraint pieces 4, one end of each set of compression spring is connected to the backrest 1200, and the other end of the compression spring is connected to the harness strap 41, so that when no external force is applied to the restraint pieces 4, the compression springs may push the corresponding harness straps 41 to bounce towards a direction away from the sitting space 1001.

In this example, the backrest 1200 is specifically provided with two connecting pieces used for being connected to the compression springs, and the two connecting pieces may rotate relative to each other on the backrest 1200 to ensure the flexibility of movement of the compression springs.

One end of each set of compression spring is connected to the corresponding connecting piece, and the other end thereof is connected to the corresponding harness strap 41 at a position relatively close to the middle in a length direction, so that the harness strap 41 may be better jacked upwards.

In other examples, the specific arrangement of the second driving piece 5 may not be limited to the compression springs, and other forms of elastic pieces and the like may be adopted.

It should be noted that in this example, the headrest 1300 may be arranged on the backrest 1200 in an up-down direction in a manner of being relatively movable to adapt to children of different heights. In this way, the two sets of restraint pieces 4 may also be respectively connected to the headrest 1300, thereby achieving height adjustment with the headrest 1300.

Referring to FIG. 1 and FIG. 2, the restraint system 2000 of this example has a restraint state and an open state on the seat body 1000.

The restraint system 2000 is in the restraint state when the child is seated in the sitting space 1001.

The insertion pieces 42 of the two sets of restraint pieces 4 are correspondingly inserted in the insertion slots 22 of the protective block 2 and locked respectively, and the two sets of restraint pieces 4 are connected to the protective block 2, thereby restraining the child in the sitting space 1001 safely and stably. At this time, the two harness straps 41 respectively overcome elastic forces of the corresponding second driving pieces 5 and extend in an up-down direction of the seat body 1000, the restraint lever 1 also overcomes the elastic force of the first driving piece 3 and extends in the up-down direction, the second end 1*b* is positioned on a front side of the sitting space 1001, the protective surface 2*a* faces the backrest 1200 and may be adhered to the waist and abdomen of the child, and the two sets of restraint pieces 4 may be adhered to protect the shoulders of the child.

When the child exits the sitting space 1001, the restraint system 2000 is in the open state. At this time, the protective block 2 is unlocked by pressing the unlocking piece 23, and the two sets of insertion pieces 42 are respectively released from the insertion slots 22, so that the two sets of restraint pieces 4 are separated from the protective block 2. Further, under the action of the first driving piece 3, the restraint lever 1 and the protective block 2 automatically rotate outwards and bounce to be open until the restraint lever 1 partially or completely abuts against the upper surface of the seat 1100, the restraint lever 1 substantially extends in a horizontal direction, the second end 1*b* is positioned on a lower side of the sitting space 1001, and the protective surface 2*a* is arranged upwards. On the other hand, under the respective actions of the two sets of second driving pieces 5, the two sets of restraint pieces 4 on the left side and the right side respectively bounce upwards and towards the left side and the right side, and move outside the sitting space 1001. In this way, when the restraint system 2000 is converted to the open state, the restraint pieces 4 and the protective piece may automatically open outwards and completely clear the sitting space 1001 only by one-click unlocking via the unlocking piece 23, so as to avoid the trouble that the conventional safety belts are stacked in the sitting space 1001, thereby not only enabling the child automobile safety seat to be neat and attractive, but also enabling the sitting space 1001 to have a sufficient space for the child to freely enter and exit, and a single parent to also easily take the child to the seat with great convenience and quickness.

In this example, as the protective block 2 has a sufficiently large and reliable protective surface 2*a*, the child may be restrained safely and stably only by means of the restraint system 2000 above. In other examples, in order to further enhance the stability of the restraint system 2000, waistbands may also be respectively arranged on the left side and the right side of the seat body 1000, and when the restraint system 2000 is in the restraint state, the waistbands on the two sides are matched with and connected to the protective block 2 to form restraint on two sides of the waist of the child. Of course, the restraint system 2000 may be further provided with a third driving piece used for driving the waistbands to automatically move away from the sitting space 1001 in the open state, so as to meet the requirements of neatness and convenience for the child automobile safety seat.

Figure 7:
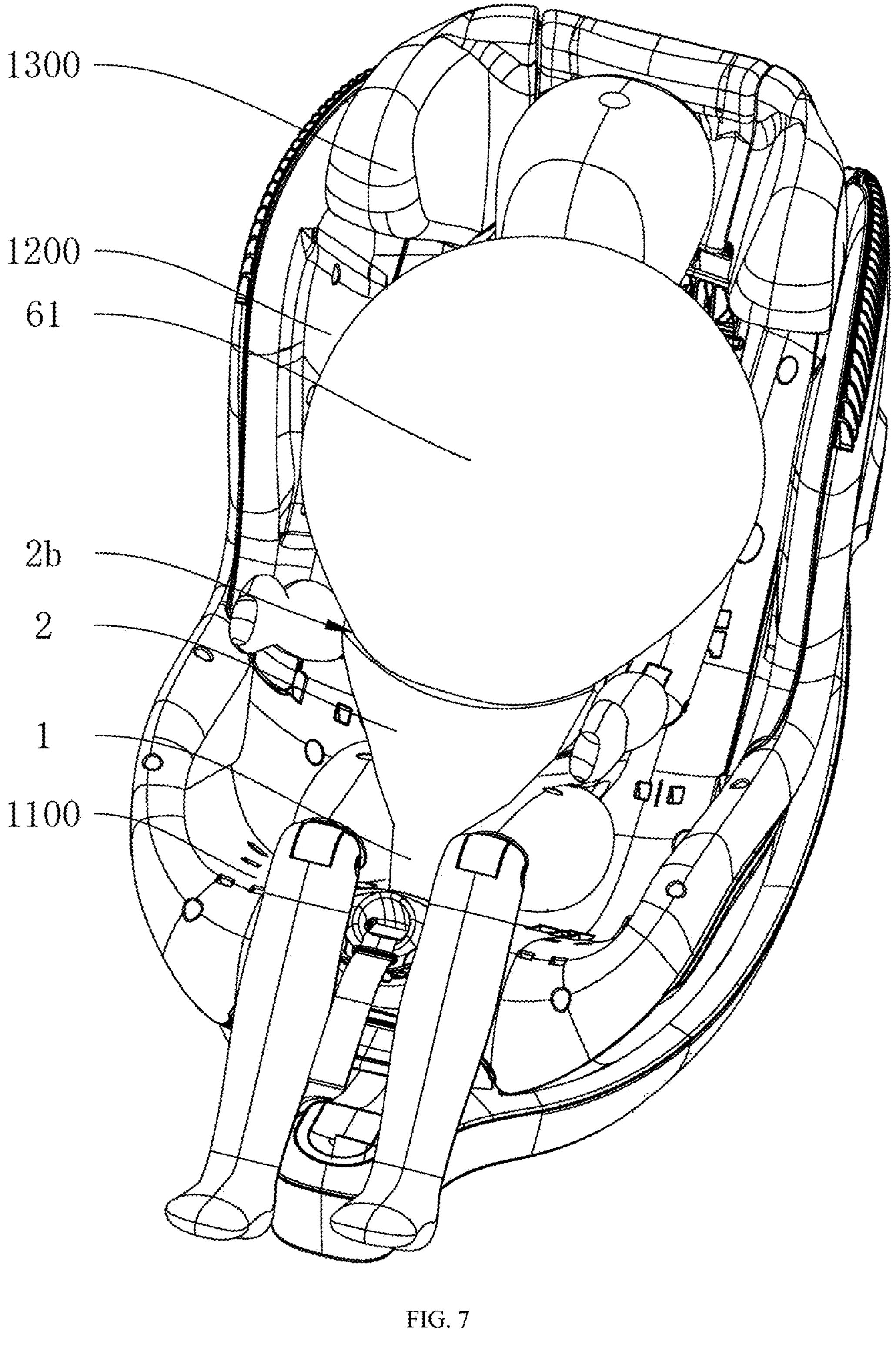
FIG. 7 is a schematic perspective view of the child seated in the child automobile safety seat in an example, with the airbag being in an open state.

Referring to FIG. 6 and FIG. 7, in some examples, the restraint system 2000 further includes an airbag 61 which may protect the child under an emergency condition, and an air generating device used for triggering inflation of the airbag 61.

Specifically, a front side of the protective block 2 is provided with an accommodating chamber 2*b*, the accommodating chamber 2*b* is provided with an opening 66 positioned on the front side of the protective piece 2, and the hollow airbag 61 is arranged in the accommodating chamber 2*b*. In this example, the accommodating chamber 2*b* is actually an inner chamber of a flexible cloth bag arranged on the front side of the protective block 2, and the airbag 61 may directly stretch the cloth bag open when entering and exiting the accommodating chamber 2*b* and is not likely to be disturbed. The airbag 61 has a storage state and an inflated state, when the airbag 61 is in the storage state, the airbag 61 is contracted and accommodated in the accommodating chamber 2*b*, and may not be observed from the outside to ensure the neatness and attractiveness of the appearance of the child automobile safety seat; and when the airbag 61 is in the inflated state, the airbag 61 is inflated to expand, bounces out of the accommodation chamber 2*b*, and is positioned outside the protective block 2 to form emergency protection for the child in the seating space 1001.

Figure 8:
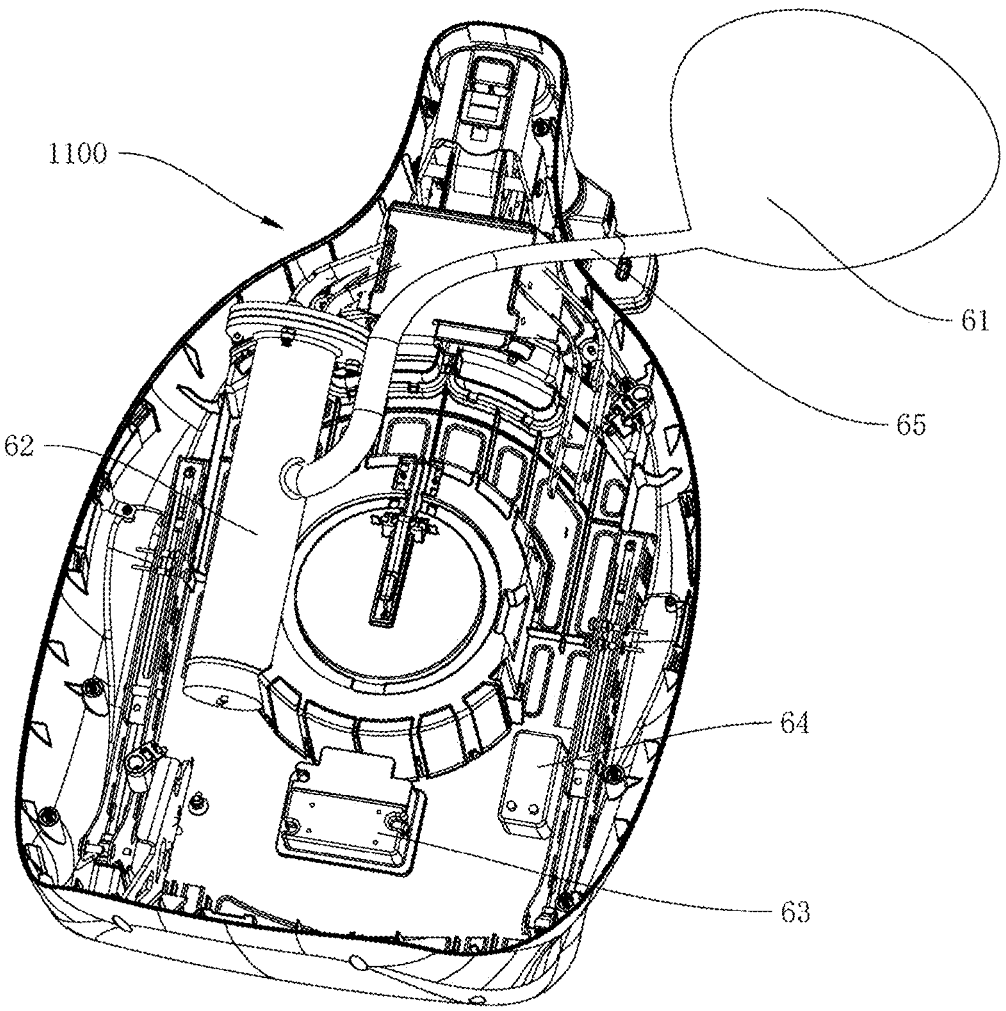
FIG. 8 is a schematic perspective view of an air generating device in an example.
Figure 9:
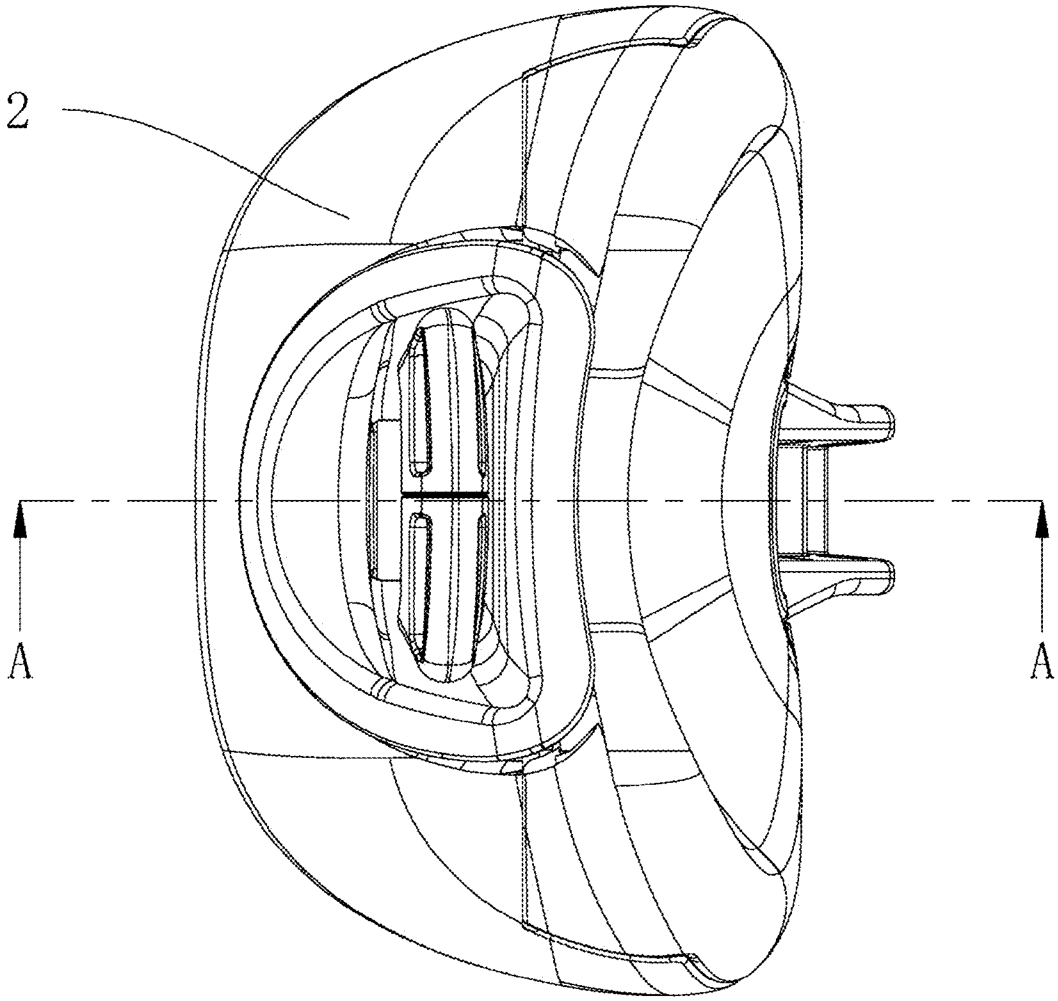
FIG. 9 is a schematic top view of the protective piece in an example, with the airbag being in the storage state.
Figure 10:
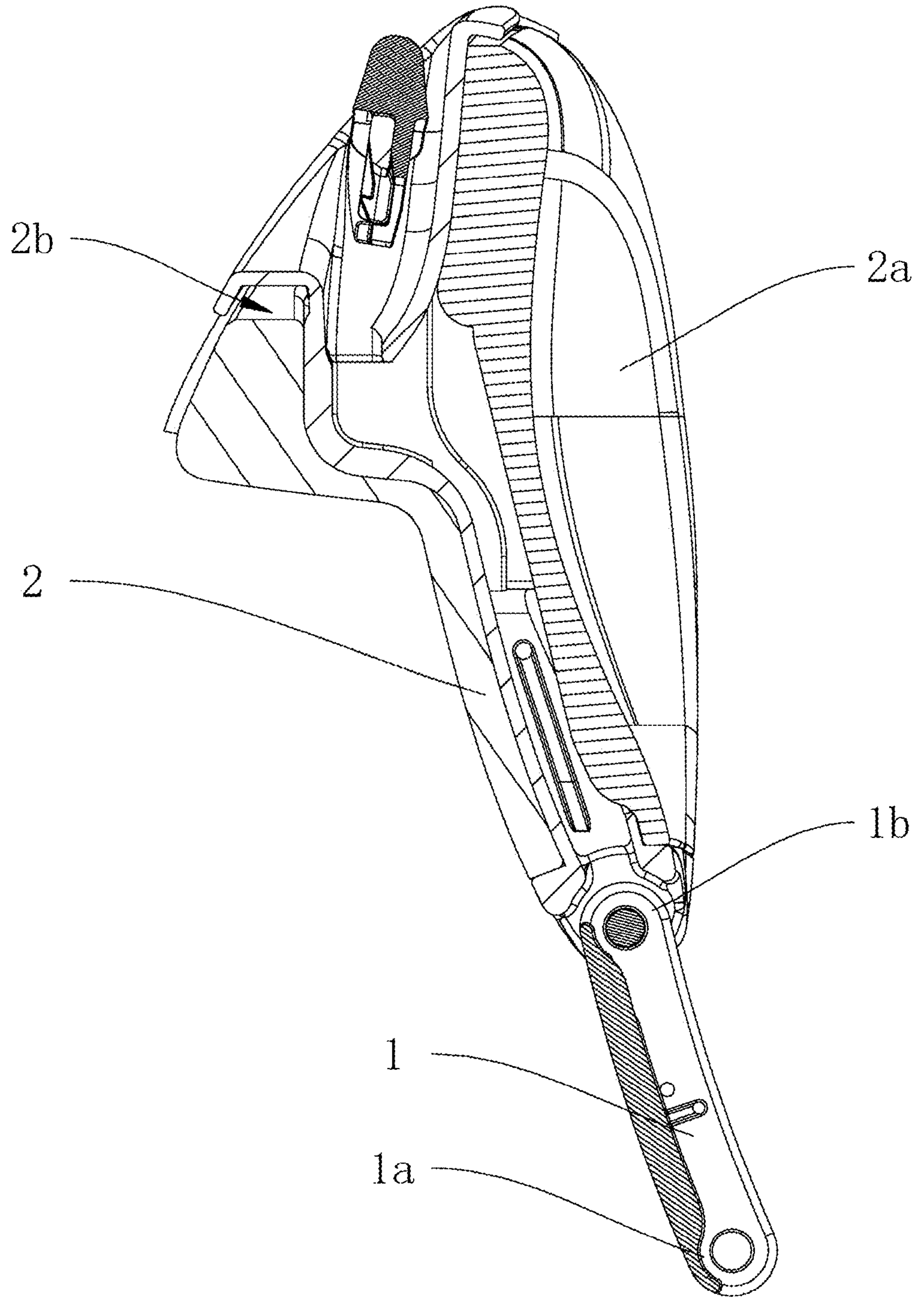
FIG. 10 is a schematic cross-sectional view taken along line A-A in FIG. 9.
Figure 11:
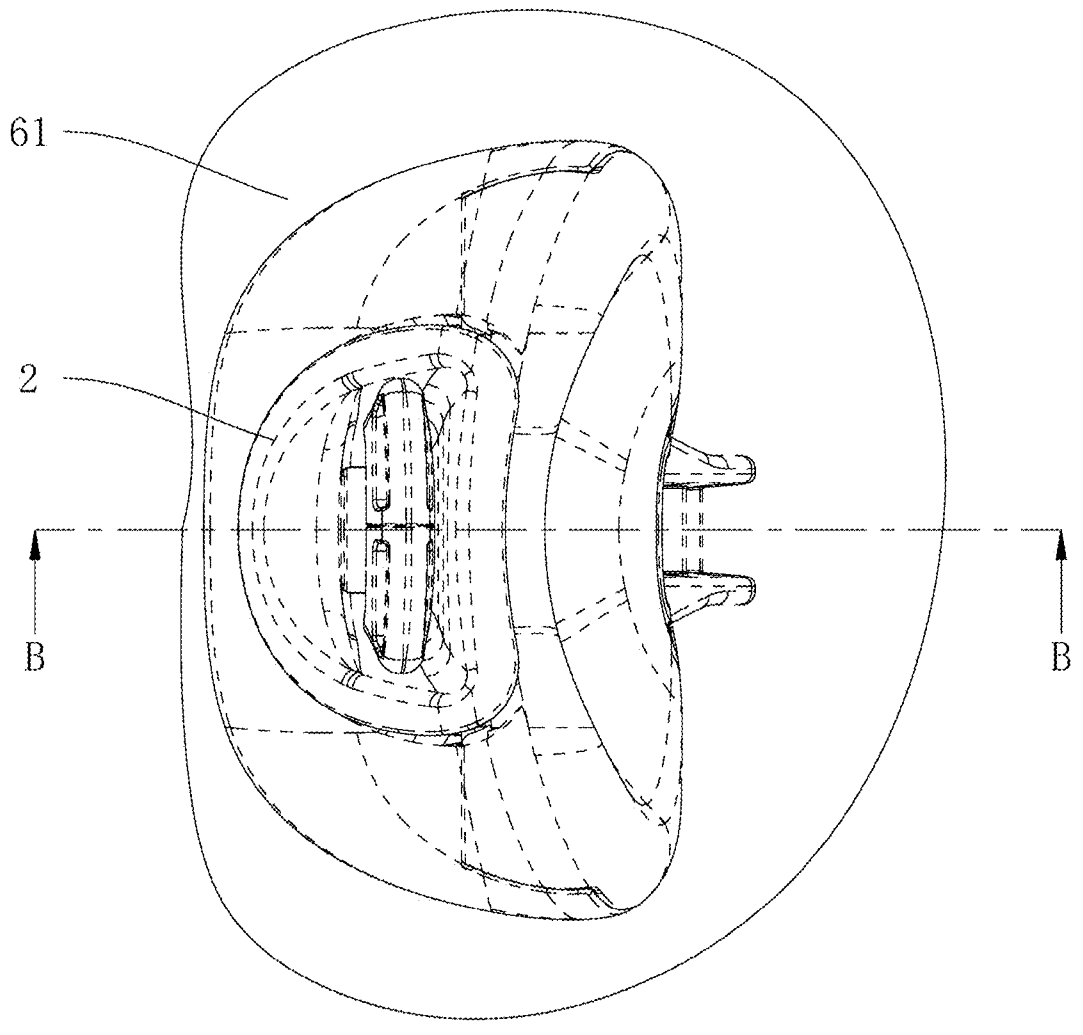
FIG. 11 is a schematic top view of the protective piece in an example, with the airbag being in the open state.
Figure 12:
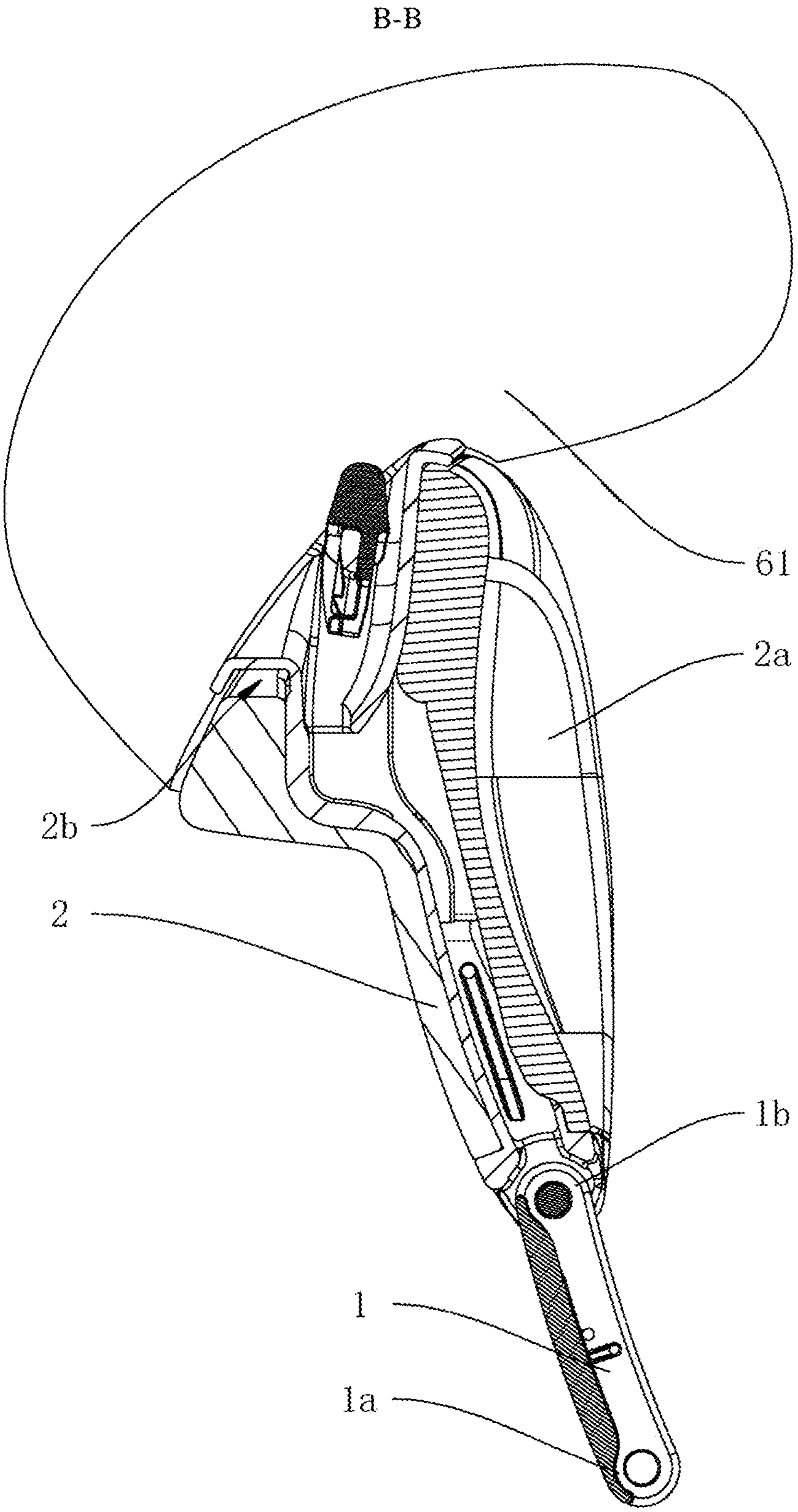
FIG. 12 is a schematic cross-sectional view taken along line B-B in FIG. 11.

Referring to FIG. 8, the air generating device includes an air generator 62, an electronic control unit 63, and a power supply 64 which are arranged on the seat body 1000, the electronic control unit 63 is electrically connected to the power supply 64 and the air generator 62 respectively, and the air generator 62 is connected to the airbag 61 through an air guide pipe 65, wherein the power supply 64 provides electric power for the electronic control unit 63, and the electronic control unit 63 used for detecting and determining a traveling condition of an automobile. When the electronic control unit 63 determines that the emergency condition such as a collision of the automobile occurs, the electronic control unit 63 immediately sends a signal to the air generator 62, and controls the air generator 62 to inflate the airbag 61, so that the airbag 61 is converted to the inflated state quickly. In this example, the air generator 62, the electronic control unit 63, and the power supply 64 above are all fixedly arranged on the seat 1100, so that the traveling condition of the automobile may be detected more accurately, thereby being less likely to be disturbed by activities of the child above the seat 1100.

Referring to FIG. 9 to FIG. 12, in this example, when the airbag 61 is converted from the storage state to the inflated state, the airbag 61 is stretched above the front side of the protective block 2.

When the airbag 61 is in the inflated state, the whole airbag 61 is positioned above the front side of the protective block 2, so as to well protect the parts such as head, shoulders, and neck of the child, and form soft support to prevent the upper body of the child from being injured by impact.

In summary, the child automobile safety seat provided by the present disclosure may restrain the child comfortably, the safety performance is greatly improved compared with the existing restraint system, and the whole set of restraint system 2000 may be automatically opened when not in use, so as to clear the sitting space 1001, and provide a sufficient space for the child to enter and exit while being neat and attractive, thereby greatly facilitating the use of the child and parents.

The examples above are only to illustrate the technical concept and features of the present disclosure, and the purpose thereof is to enable those skilled in the art to understand and implement the content of the present disclosure. The protection scope of the present disclosure may not be limited by these examples, and any equivalent changes or modifications made in accordance with the spirit of the present disclosure shall be covered by the protection scope of the present disclosure.

The invention claimed is:

1. A child automobile safety seat, comprising a seat body having a sitting space, and a restraint system used for restraining a child in the sitting space, the seat body comprising a seat and a backrest, the restraint system comprises a restraint piece and a protective piece, wherein the restraint piece is connected with at least one of the seat and the backrest, the protective piece is movably disposed in a front part of the seat, the protective piece is provided with a protective surface which faces the sitting space and is used for protecting waist and abdomen of the child, the restraint system has a restraint state and an open state, when the restraint system is in the restraint state, the restraint piece is attached to the protective piece; and when the restraint system is in the open state, the restraint piece is detached from the protective piece;

wherein the protective piece is rotatably disposed on the seat through a first shaft;

wherein the restraint system comprises a first driving piece rotatably disposed on the seat with respect to the first shaft, when the restraint system is in the open state, the first driving piece drives the protective piece to be away from the sitting space.

2. The child automobile safety seat according to claim 1, when the restraint system is in the restraint state, the protective piece rotates to the position where the protective surface faces the backrest; and when the restraint system is in the open state, the protective piece rotates to the position where the protective surface faces upwards.

3. The child automobile safety seat according to claim 2, wherein the protective piece comprises a restraint lever rotatably disposed on the seat through the first shaft, and a protective block rotatably disposed on the restraint lever.

4. The child automobile safety seat according to claim 3, wherein the restraint lever is further provided with a first end and a second end respectively arranged at opposite ends of the restraint lever in a length direction, wherein the first end is disposed on the seat, the protective block is arranged at the second end, the restraint lever is gradually curved towards the sitting space from the first end to the second end.

5. The child automobile safety seat according to claim 4, wherein the protective surface is disposed on the protective block, and a width of the protective surface is gradually increased in a direction extending from the first end to the second end.

6. The child automobile safety seat according to claim 5, wherein the protective block is in a triangular shape with a wide upper portion and a narrow lower portion.

7. The child automobile safety seat according to claim 1, wherein the restraint system comprises a second driving piece disposed between the seat and the restraint piece, when the restraint system is in the open state, the second driving piece drives the restraint piece to be away from the sitting space.

8. The child automobile safety seat according to claim 1, wherein two sets of restraint pieces are respectively arranged on a left side and a right side of the backrest, each set of restraint piece comprises a harness strap and an insertion piece disposed at one end of the harness strap, and the protective piece is provided with an insertion slot; when the restraint system is in the restraint state, the two sets of insertion pieces are respectively inserted into the insertion slots correspondingly; and when the restraint system is in the open state, the two sets of insertion pieces are respectively released from the insertion slots.

9. The child automobile safety seat according to claim 1, wherein one side of the protective piece which faces the sitting space is provided with a flexible protective cushion, and the protective surface is formed on the protective cushion.

10. The child automobile safety seat according to claim 1, wherein the protective surface is a cambered surface which is gradually curved towards the sitting space from inside to outside in the left-right direction of the seat body.

11. The child automobile safety seat according to claim 1, wherein the restraint system further comprises a hollow airbag, the airbag is arranged on the protective piece, the protective piece is provided with an accommodating chamber, the airbag has a storage state and an inflated state, when the airbag is in the storage state, the airbag is accommodated in the accommodating chamber; and when the airbag is in the inflated state, the airbag is inflated and expanded to the outside the protective piece.

12. The child automobile safety seat according to claim 11, wherein the accommodating chamber is provided with an opening positioned on a front side of the protective piece, when the airbag is converted from the storage state to the inflated state, the airbag is stretched above the front side of the protective piece; and when the airbag is in the inflated state, at least part of the airbag is positioned above the front side of the protective piece.

13. The child automobile safety seat according to claim 11, wherein the restraint system further comprises an air generating device, the air generating device comprises an air generator, an electronic control unit and a power supply, all of which are arranged on the seat body, the electronic control unit is electrically connected to the power supply and the air generator respectively, and the air generator is fluidly interconnected with the airbag.

14. The child automobile safety seat according to claim 13, wherein the air generating device further comprises an air guide pipe, a first end of the air guide pipe is connected with the air generator, a second end of the air guide pipe is connected with the outer edge of the airbag.

15. A child automobile safety seat, comprising a seat body having a sitting space, and a restraint system used for restraining a child in the sitting space, the seat body comprising a seat and a backrest, the restraint system comprises a restraint piece and a protective piece, wherein the restraint piece is connected with at least one of the seat and the backrest, the protective piece is movably disposed in the front part of the seat, the protective piece is provided with a protective surface which faces the sitting space and is used for protecting waist and abdomen of the child, the restraint system has a restraint state and an open state, when the restraint system is in the restraint state, the restraint piece is attached to the protective piece; and when the restraint system is in the open state, the restraint piece is detached from the protective piece;

wherein the protective piece is rotatably disposed on the seat through a first shaft, when the restraint system is in the restraint state, the protective piece rotates to the position where the protective surface faces the backrest; and when the restraint system is in the open state, the protective piece rotates to the position where the protective surface faces upwards;

wherein the restraint system comprises a first driving piece rotatably disposed on the seat with respect to the first shaft, when the restraint system is in the open state, the first driving piece drives the protective piece to be away from the sitting space.

* * * * *